(12) United States Patent
Lacaze et al.

(10) Patent No.: US 10,906,668 B2
(45) Date of Patent: Feb. 2, 2021

(54) FIELD DEPLOYABLE RAPID PROTOTYPABLE UXVS

(71) Applicants: Alberto Daniel Lacaze, Potomac, MD (US); Karl Murphy, Rockville, MD (US)

(72) Inventors: Alberto Daniel Lacaze, Potomac, MD (US); Karl Murphy, Rockville, MD (US)

(*) Notice: Subject to any disclaimer, the term of this patent is extended or adjusted under 35 U.S.C. 154(b) by 160 days.

(21) Appl. No.: 16/193,338

(22) Filed: Nov. 16, 2018

(65) Prior Publication Data
US 2019/0084694 A1  Mar. 21, 2019

Related U.S. Application Data

(63) Continuation-in-part of application No. 13/871,129, filed on Apr. 26, 2013, now abandoned.

(60) Provisional application No. 61/642,035, filed on May 3, 2012.

(51) Int. Cl.
| | |
|---|---|
| *B64F 5/10* | (2017.01) |
| *B29C 64/112* | (2017.01) |
| *B33Y 50/02* | (2015.01) |
| *B29L 31/30* | (2006.01) |
| *B33Y 10/00* | (2015.01) |
| *B33Y 30/00* | (2015.01) |
| *B33Y 70/00* | (2020.01) |
| *B33Y 80/00* | (2015.01) |
| *B64C 39/02* | (2006.01) |
| *B33Y 50/00* | (2015.01) |

(52) U.S. Cl.
CPC .............. *B64F 5/10* (2017.01); *B29C 64/112* (2017.08); *B29L 2031/3076* (2013.01); *B33Y 10/00* (2014.12); *B33Y 30/00* (2014.12); *B33Y 50/00* (2014.12); *B33Y 50/02* (2014.12); *B33Y 70/00* (2014.12); *B33Y 80/00* (2014.12); *B64C 39/024* (2013.01); *B64C 2201/126* (2013.01)

(58) Field of Classification Search
None
See application file for complete search history.

(56) References Cited

U.S. PATENT DOCUMENTS 9,757,881 B2  9/2017  Tummala et al.

FOREIGN PATENT DOCUMENTS

| | | |
|---|---|---|
| CN | 103737934 A | 4/2014 |
| CN | 104228068 A | 12/2014 |
| CN | 103350508 B | 10/2015 |

(Continued)

*Primary Examiner* — Carlos R Ortiz Rodriguez
(74) *Attorney, Agent, or Firm* — Radha Narayanan

(57) ABSTRACT

A 3D printer that can use ABS-plus plastic material deployed in the battlefield for printing polycarbonate, or rubber components individually or in combination to create component parts comprised of two or more materials. A library of autonomous vehicles will be created utilizing the standard components and the 3D printer. These libraries will include a variety of light weight UGVS, fixed wings UAVS, quads rotors, hex-rotors, UGS, etc. The library will also include a variety of standard payloads that would be interchangeable from platform to platform. Each model in the library will provide the operator with a performance envelop of the printed system. A submission and approval process will be created for new devices. A common control architecture for controlling the devices will be forced on every model in the library.

18 Claims, 3 Drawing Sheets

(56) References Cited

FOREIGN PATENT DOCUMENTS

| | | |
|---|---|---|
| CN | 105394801 A | 3/2016 |
| CN | 103213281 B | 5/2016 |

FIELD DEPLOYABLE RAPID PROTOTYPABLE UXVS

CROSS REFERENCE TO RELATED APPLICATIONS

This application is a Continuation-In-Part of co-pending U.S. patent application Ser. No. 13/871,129, entitled "Field Deployable Rapid Prototypable UXVs", filed Apr. 26, 2013.

U.S. patent application Ser. No. 13/871,129 claims priority from U.S. patent application Ser. No. 61/642,035, entitled ": Field Deployable Rapid Prototypable UXVs", filed on 3 May 2012.

TECHNICAL FIELD OF THE INVENTION

The present invention relates generally to rapid prototyping using 3D printers. More specifically, the present invention relates to rapid prototyping using 3D printers in the battlefield whereby operators can build, repair, or update deployed equipment by accessing a database of components providing detailed information for selection and printing on a 3D printer.

BACKGROUND OF THE INVENTION

Recent conflicts have illustrated the dynamic nature of modern conflicts. In a dynamic battlefield, providing the right tools to the warfighter is a difficult challenge given current procurements and deployment strategies. Fighting nontraditional armies necessitates quick and reasonable responses to non-traditional weapons and dangers. Compare this philosophy with past conflicts where US Forces and allies could rely on research and development cycles develop weapons and counter-weapons of opposing armies. While non-traditional weapons have many detriments, their strength lies in the speed with which new weapons can be created. To properly respond to new threats these weapons create, rapid countermeasure development and deployment is of paramount importance.

The DoD is attempting to address this problem by rapidly developing requirements, developing solutions, and streamlining the procurement process. This strategy has had some success; however, it is very common for a newly-deployed system from this methodology addressing a now obsolete problem. In other words, the new enemy tactic could not be continued long term or warfighters adapted using suboptimal methods and made this new tactic not worth continuing. Thus, the problem simply "went away." Clearly, this case leads to a large amount of development and procurement waste.

The present invention teaches a system, method, and devices that are capable of revolutionizing the ability to adapt the tools to the warfighter at rates that are not currently achievable by status quo procurement and deployment processes.

Definitions

Unless stated to the contrary, for the purposes of the present disclosure, the following terms shall have the following definitions:

"Payload" is defined as the carrying capacity of an aircraft or launch vehicle, usually measured in terms of weight. Depending on the nature of the flight or mission, the payload of a vehicle may include cargo, passengers, flight crew, munitions, scientific instruments or experiments, or other equipment. Extra fuel, when optionally carried, is also considered part of the payload.

In a commercial context (i.e., an airline or air freight carrier), payload may refer only to revenue-generating cargo or paying passengers. For a rocket, the payload can be a satellite, space probe, or spacecraft carrying humans, animals, or cargo. For a ballistic missile, the payload is one or more warheads and related systems; the total weight of these systems is referred to as the throw-weight.

The fraction of payload to the total liftoff weight of the air or spacecraft is known as the "payload fraction". When the weight of the payload and fuel are considered together, it is known as the "useful load fraction". In spacecraft, "mass fraction" is normally used, which is the ratio of payload to everything else, including the rocket structure."

The present invention uses "Performance Envelope" as the term for describing to refer to the strict limits in which an event will take place or more generally to the predictable behavior of a given phenomenon or situation based on the payload being carried or attached to a plane, where the specifics of the payload effect the flight envelope, or potential performance of the aircraft, which is then defined as the "Performance Envelope" of the aircraft as used by the present invention.

In aerodynamics, the flight envelope, service envelope, or performance envelope of an aircraft or interplanetary spacecraft refers to the capabilities of a design in terms of airspeed and load factor or atmospheric density, often simplified to altitude for Earth-borne aircraft. The term is somewhat loosely applied, and can also refer to other measurements such as maneuverability. When a plane is pushed, for instance by diving it at high speeds, it is said to be flown "outside the envelope", something considered rather dangerous.

Performance envelope/Flight envelope is one of a number of related terms that are all used in a similar fashion. Flight envelope is perhaps the most common term because it is the oldest, first being used in the early days of test flying. It is closely related to more modern terms known as extra power and a doghouse plot which are different ways of describing a flight envelope. In addition, the term Flight envelope has been widened in scope outside the field of engineering, to refer to the strict limits in which an event will take place or more generally to the predictable behavior of a given phenomenon or situation, and hence, its "flight envelope".

The present invention teaches, discloses, and claims a "performance envelope" which is affected by "payload".

SUMMARY OF THE INVENTION

The proposed system is comprised of a 3D printer that can use ABS-plus plastic material deployed in the field. Other materials could also be printed such as polycarbonate, rubber, etc. individually or in combination to create component parts comprised of two or more materials. A small number of standard components including small motors, controllers, radios, propellers, batteries, etc. will be deployed with the printer.

A library of autonomous vehicles will be created utilizing the standard components and the 3D printer. These libraries will include a variety of light weight UGVS, fixed wings UAVS, quads rotors, hex-rotors, UGS, etc. The library will also include a variety of standard payloads (for radios, explosives, etc.) that would be interchangeable from platform to platform. Each model in the library will provide the operator with a performance envelop of the printed system. For example, a quad-rotor will have the expected flight time, and max payload, speed, etc.

In order for developers to create new models for these libraries, a submission and approval process will be created. These new devices will be added to the printer's repertoire, allowing a warfighter to print the new models as needed. A common control architecture for controlling the devices will be forced on every model in the library.

Payment to model developers would be handled on a unit by unit basis. The mechanical structure of the system will be virtually free making the systems low cost and virtually disposable.

UxV or UXV stands for any one of the four categories of unmanned vehicle: ground, air, surface, or undersea. Humans operate these vehicles from remote locations. Widgets are user-configured Web applications that provide a limited view into a larger application, similar to windows within a Web browser that display interactive Web applications. The cloud is the collective computer power of remotely accessed networked servers and computers—very much like the networks that you access on your cell phone or laptop. Synthesizing these three distinct technologies presents a novel approach to unmanned vehicle control.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
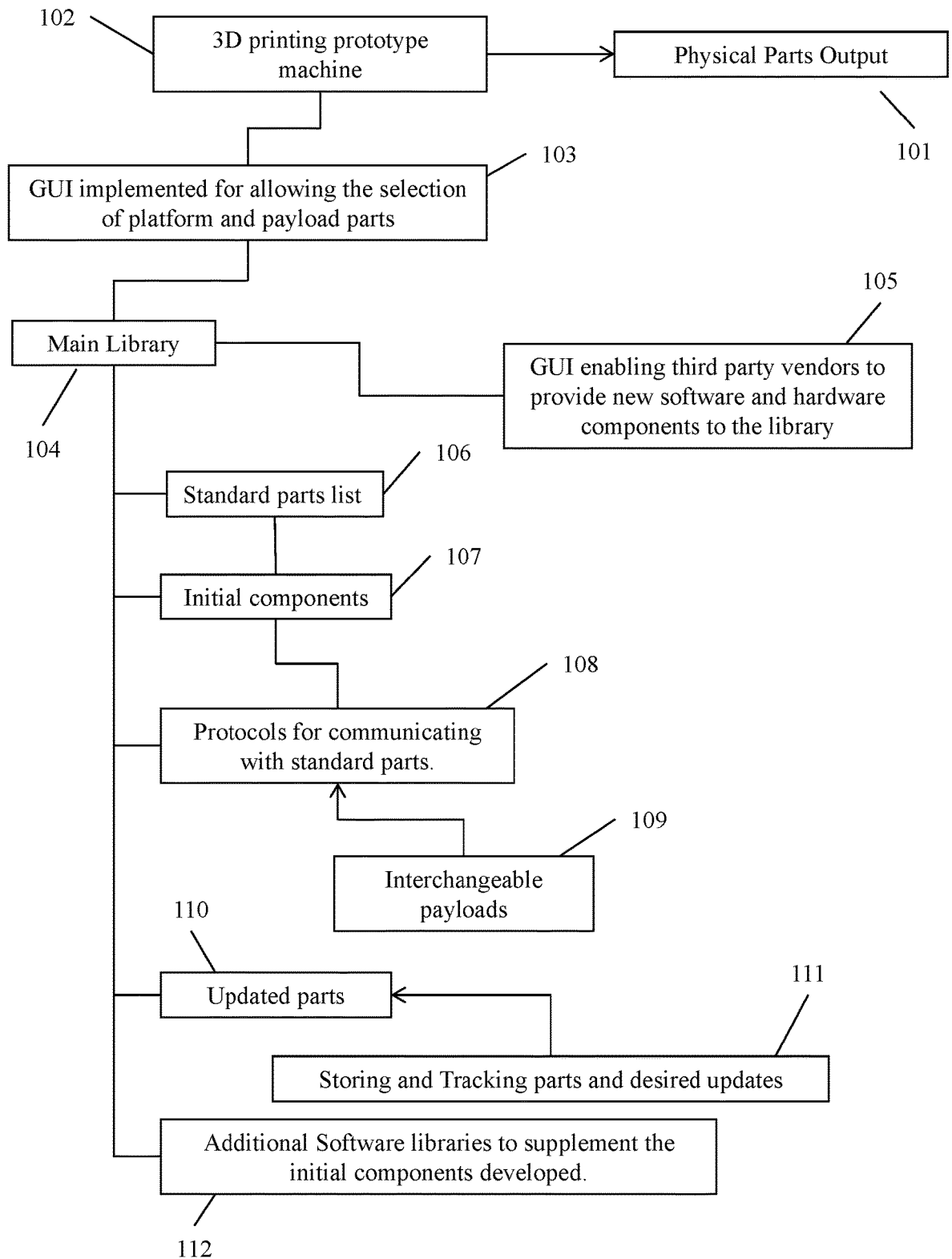
FIG. 1 is a flow chart illustrating the method of the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Rapid prototyping or 3D printing has been a dream of engineers and architectures for centuries. In the past decade, rapid prototyping machines have evolved some significant characteristics that can make them useful for this problem.

The materials utilized by rapid prototyping machines in the 1990's and early 2000's used to be clay composites that were mainly designed to provide aesthetical confirmation of the design but were not designed to be functional prototypes. This has changed in the late 2000's. ABS and ABS-Plus material can now be used by a large number of 3D printers. The models built with these printers are not only working prototypes, they can be actual parts that provide very similar mechanical characteristics to their injection molded counterparts.

The cost of the machines has changed from $100K in the 1990s to $2-20k at the present time with some of the smallest machines in the $1K range. The plastic that these machines utilize costs about $4 per cubic inch.

The machine size has decreased with time. What was once the size of a car has been transformed into a machine possibly as small as a small, carry-on piece of luggage.

Titanium based 3$d$ printers are being developed; although not ready for daily use, these printers will provide new materials to further increase the repertoire of possible devices in the near future. The process will be able to generate mechanical designs that would be impossible to machine using conventional means.

As expected, field repair of these systems will become trivial by reprinting parts that have been broken, lost, or worn out. Standard parts like motors can be reused, and plastic can be recycled, further minimizing the operational footprint. These parts can be printed by untrained personal. Parts that would be hard or impossible to machine can easily be generated in minutes.

All deployed systems are a compromise between the needs of the operator, the cost of the system, and the logistic trail that they generate. The complicated balance between these usually opposing goals generates compromises that reduce the capabilities and frustrates operators.

These compromises are so glaring in the UGV (unmanned ground vehicle) market that they are hard to ignore. For example, the DR20 could have 4 times its endurance if it was not also designed to carry an EOD capable arm. In many missions, this arm is not used; however, there is no automatic increase in endurance that comes from this decision not to use the arm. The DoD would have to deploy multiple versions of kits to better exploit the performance of these different missions. Each new platform and kit creates a logistic trail that needs to be addressed in cost, parts availability, and ultimately performance. If the designers of the vehicle were to fully optimize the endurance of the DR 20, they would not add the weight as a payload kit and therefore increase the height of the center of mass. A better design would be performed by embedding the extra batteries in the lower part of the body, and raising the electronics to the mission bay instead. The proposed method and system will eliminate most of these problems, the logistic trail will only be based on the parts of the standard kit, and the performance of each design would be better optimized for the particular application.

Many attempts have been made at creating a common OCU (operator control unit) between different UXV (unmanned X vehicle) platforms. The reality is that vendors hate the idea. The OCU is long considered the gateway to all applications that the vehicles may be used for, and whoever controls it becomes the de-facto system integrator. It is not mere chance that the DoD has struggled for such a long time to make this happen. By having the standard parts in the proposed system, it levels the playing field from an OCU and controller standpoint. The interfaces to the standard parts kit will be open, and therefore, the OCU interfaces will be exposed. Once these interfaces are exposed, the "system integrator" allure provided by the OCU falls by the wayside. We even see that the controller or at least some extensions to this controller could actually be printed in the field.

As shown in FIG. 1, the present invention will be comprised of developing an improved 3D printing prototype machine or using a 3D printing prototype machine 102 already known in the art for the creating and output of physical parts 101. The present invention will define a standard parts list 106 and develop a methodology for creating a library 104 with interchangeable payloads 109. Protocols 108 will be created for communicating with standard parts 106, update parts 110, and initial components 107. A simple interface 103 will be implemented for allowing the selection of platform and payload parts 106. A library 104 will be maintained that stores and tracks parts and desired updates 111. Additional software libraries and a store 112 will allow third party vendors to provide new software and hardware components to the main library 104 to supplement the initial components 107 developed.

Figure 2:
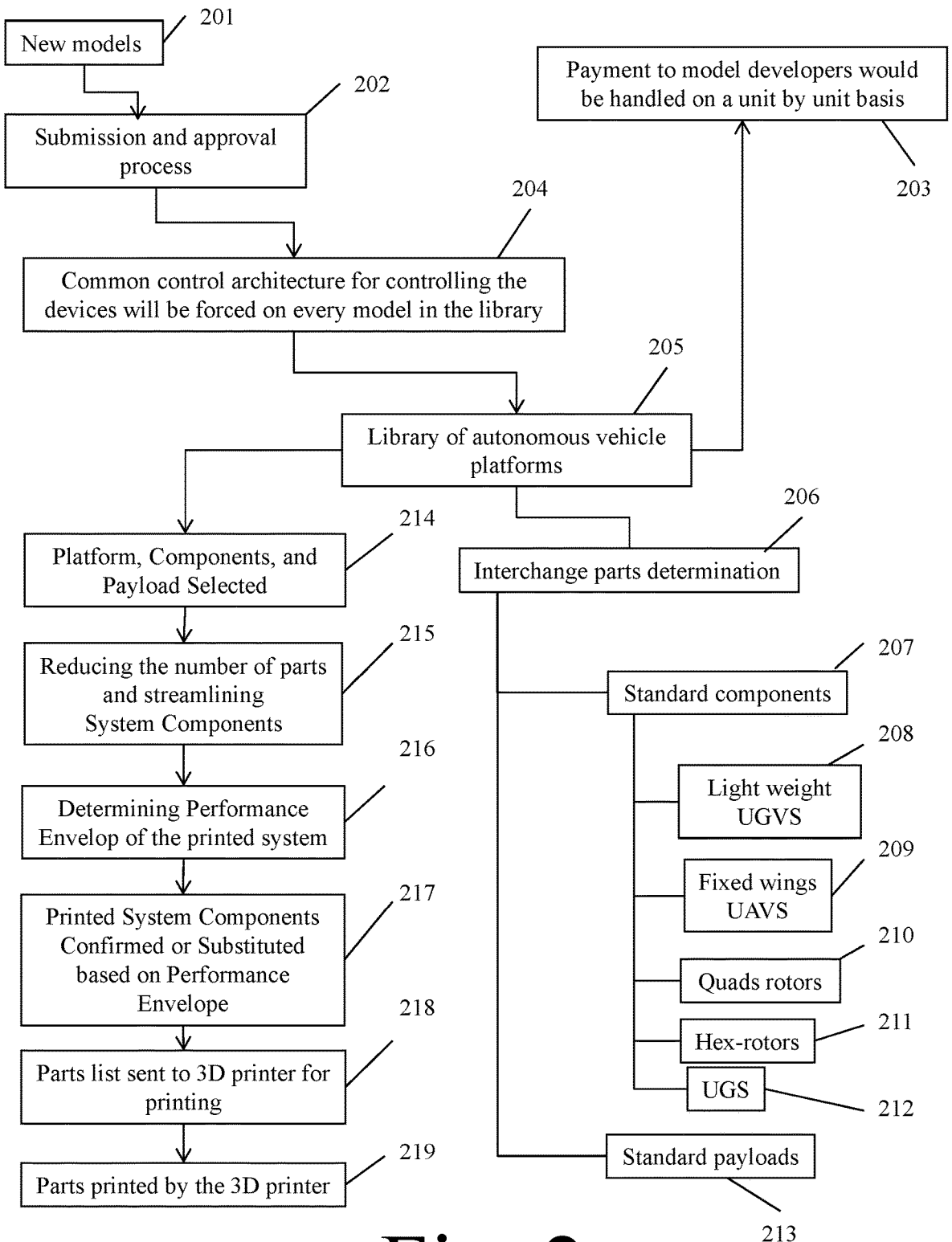
FIG. 2 is a flow chart illustrating the library creation, methodology, and process as taught by the present invention.

As shown in FIG. 2, a library of autonomous vehicles platforms 205 will be created utilizing the standard components 207 and the 3D printer 102. These libraries 205 will include a variety of light weight UGVS (unmanned aerial vehicle systems) 208, fixed wings UAVS 209, quads rotors 210, hex-rotors 211, UGS (unmanned ground systems) 212, etc. The library 205 will also include a variety of standard payloads 213 (for radios, explosives, etc.) that would be interchangeable from platform to platform and a module for interchange parts determination 206. Each model in the library 205 will provide the operator with a performance envelop of the printed system. For example, a quad-rotor will have the expected flight time, and max payload, speed, etc.

In use, one or more components, and one or more payloads will be selected 214 from the library 205. The number of parts will be reduced and streamlined as determined by the system components 215. The performance envelope of the printed system will be determined 216 and the operator can then review the performance envelop information and either confirm or substitute printed system components based on the performance envelope and desired changes 217. Upon confirmation of the printed system components, the parts list is sent 218 to the 3D printer 102 and the parts are printed 219 by the 3D printer 102.

In order for developers to create new models 201 for these libraries, a submission and approval process 202 will be created. These new model devices 201 will be added to the printer's repertoire and library 205, allowing a warfighter to print the new models 201 as needed. A common control architecture 204 for controlling the devices will be forced on every model in the library.

Payment to model developers 203 would be handled on a unit by unit basis. The mechanical structure of the system will be virtually free making the systems low cost and virtually disposable.

Figure 3:
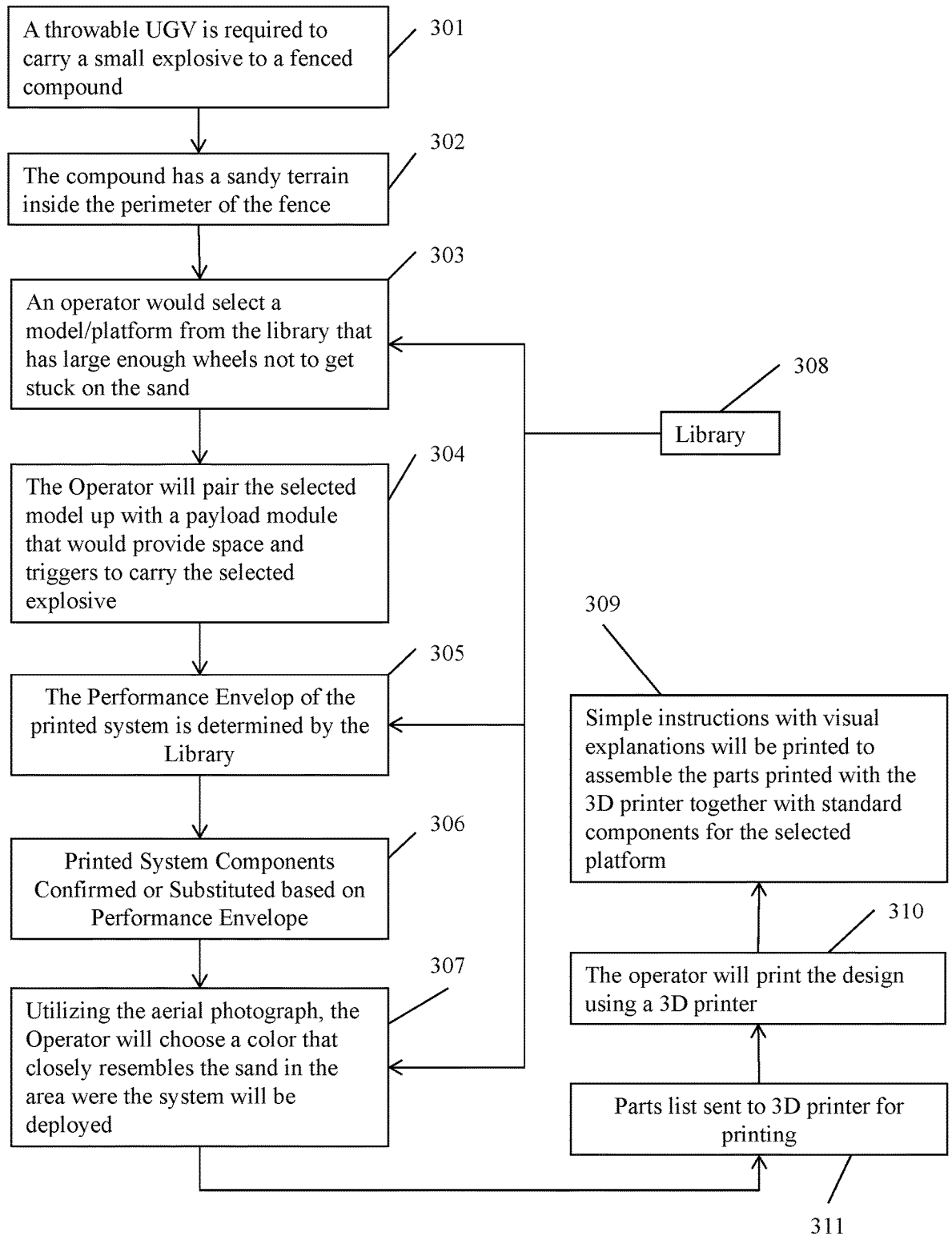
FIG. 3 is a flow chart illustrating the method applied in the field in one exemplary device that may be comprised of a plurality of interchangeable parts that can be chose from the library, printed by a 3D printer, and assembled in the field based on select criteria.

In one example show in FIG. 3, a throwable UGV (unmanned ground vehicle) is required to carry a small explosive to a fenced compound 301. The compound has a sandy terrain inside the perimeter of the fence 302. An operator would select a model from the library 308 that has large enough wheels not to get stuck on the sand 303. He will pair it up with a payload module that would provide space and triggers to carry the selected explosive 304. The performance envelope of the printed system is determined 305 by the library 308. The operator can then confirm or substitute the system components 306 based on the determined performance envelope of step 305. By utilizing an aerial photograph, he will choose a color that closely resembles the sand in the area were the system will be deployed 307. The operator will print the design 310 using a 3D printer 102 by sending the parts list 311 to the 3D printer 102. Simple instructions 309 with visual explanations will be printed to assemble the parts printed with the 3D printer together with standard components from the kit (motors, radios, etc.). The system should be ready to use within a few hours. If these systems are successful, a simple pick and place arm could be added to the 3D printer to automatically finalize the assembly of the system.

Although, the system in the above example could have been created and manufactured in the US. It would not be possible to have such a wide variety of systems deployed. Consider the aforementioned scenario, where a throwable UGV (unmanned ground vehicles) capable of traversing sand, carrying an explosive, and having a sand yellow color. Although feasible to construct, such an UGV would not be a good candidate for deployment because it is too specialized for the particular mission. This and other highly specialized models can be available in the libraries available to the warfighter without generating an extra logistic trail for systems, parts, or controllers.

The advantages of having the right tool for the right job are self-evident and could provide a new level of adaptability to warfighters. Very often, we hear from warfighters returning home: "if I could only have had so and so functionality in the field." It is our experience that special operators are trained to be highly innovative and adaptable to the environment customizing COTS devices to produce and utilize tactically functional systems. We have seen operators transform house heaters into microphones and cell phones into tracking devices. Obviously, the proposed system cannot be used to build a flail or bullet proof armor, but we believe that in the hands of inventive operators, the system will quickly become invaluable.

UGVs (unmanned ground vehicles) and UAVs (unmanned aerial vehicles) are a perfect candidate for this manufacturing process. In general, these devices need to be highly specialized for the operation, are expensive, and are being produced in an astonishing variety of capability classes creating a logistics and training nightmare. In theater, they are usually treated almost as consumables tend to have relatively short lifetimes (sometimes measured in hours). Attempts by the government to own the design of these systems are likely to fail because by the time the government builds a system that works, it is likely to be obsolete.

The proposed method not only has the potential of speeding up the deployment, but it also has the potential of making the systems significantly cheaper. In general, there is no real reason that the motor in the UGV built by company X and the UGV built by company Y are different. They are different because they have been designed by competing companies that have no interest in collaborating. By forcing each design to use the same components, the government will have the advantage of economy of scale and minimize the required number of parts and connectors.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A computer implemented method for rapid prototypable Unmanned X Vehicles (UXV), the
   method comprising:
       a computer executing the following steps:
           receiving input from developers submitting components and parts to a plurality of libraries,
               wherein the libraries are collections of UXV platforms, UXV standard parts, and a interchangeable payloads;
           providing and storing a library of UXV platforms;
           providing and storing a library of UXV standard parts and components;
           providing and storing a library of UXV interchangeable payloads, where payload includes cargo, passengers, flight crew, munitions, scientific instruments or experiments;
           providing and executing protocols for communicating interchangeable UXV payloads with UXV standard parts;
           displaying an interface allowing the selection of platform and payload parts;
           storing and tracking parts and desired updates to UXV platforms, standard parts, and interchangeable payloads;
           providing access by third parties to provide new software and hardware components to the libraries for storage and use, to supplement initial UXV platforms, standard parts and components, and interchangeable payloads;
           selecting one or more UXV platforms, standard parts, and interchangeable payloads to create a printing system;
           generating a parts list;
       generating a performance envelop of the printing system based on the part list and parts properties from the library of UXV platforms, library of UXV standard parts and components, and library of UXV interchangeable payloads;
       the performance envelope determining the predictable behavior of a given phenomenon or situation based on the payload being carried by the specific UXV platform and standard parts and components selected for the printing system, where the specifics of the payload effect the flight envelope, or potential performance of the UXV;
           sending the parts list to a 3D printing machine;
       printing parts by the 3D printing machine;
           accounting and charging a user for the part printed;
           and compensating the developer for the printed part.

2. The method of claim 1, further comprising the step of: creating a library of UXVs utilizing the platforms, standard parts, and interchangeable payloads.

3. The method of claim 2, wherein the library of UXV platforms includes a variety of light weight unmanned ground vehicles (UGVS), fixed wings unmanned air vehicles (UAVS), quads rotors, hex-rotors, and unattended ground sensor (UGS).

4. The method of claim 3, wherein
the library of UXV interchangeable payloads include one or more standard payloads that are interchangeable between the UXV platforms found in the library of platforms; and
each part in the library of platforms, library of standard parts, and library of interchangeable payloads provides an operator with a performance envelop of a printed system, based on the selected combination of platform, parts, and payload(s).

5. The method of claim 1, further comprising the steps of:
selecting one or more payloads from the library of interchangeable payloads to create a desired printing system;
determining the number of system parts and components as required for the desired printing system;
reducing and streamlining the number of parts as determined by the system components selected for the desired printing system;
generating a performance envelope of the desired printing system;
reviewing the performance envelop information of the desired printing system;
either confirming or substituting parts of the desired printing system components based on the performance envelope and any component changes;
upon confirmation of the printed system components, sending the parts list to the 3D printer for printing by the 3D printer.

6. The method of claim 1, further comprising the steps of:
providing a submission and approval process in order for developers to create new platforms, parts, components, and interchangeable payloads for inclusion in the library of platforms, library of standard parts, and library of interchangeable payloads; and
requiring a common control architecture for controlling all platforms, parts, and interchangeable payloads in the library of platforms, library of standard parts, and library of interchangeable payloads.

7. The method of claim 1, further comprising the step of:
printing instructions with visual explanations to assemble the parts printed with the 3D printer together with standard components.

8. A method for providing field deployable rapid prototypable devices
comprising the steps of: deploying a computer capable of storing and executing
software and sending printing
commands to a 3D printer;
deploying a 3D printer;
deploying one or more standard Unmanned X Vehicles (UXV) platforms and standard parts with the computer and 3D printer;
providing a library of autonomous UXV platforms, parts, and payloads by the computer;
selecting printed parts, components, and payloads for use in creating parts to be used along or in combination with the UXV platform, standard parts, and payloads;
generating a performance envelop of the complete UXV based on the selected UXV platform, standard parts, components, and payload properties;
the performance envelope determining the predictable behavior of a given phenomenon or situation based on the payload being carried by the specific UXV platform and standard parts, components, and payload selected for the printing system, where the specifics of the payload effect the flight envelope, or potential performance of the UXV; and creating the selected parts by sending the printing information from the computer to the 3D printer for printing.

9. The method of claim 8, wherein the standard components deployed in a field environment include motors, controllers, radios, propellers, and batteries.

10. The method of claim 8, wherein one or more printed system component parts are used in combination to create a complete system.

11. The method of claim 8, wherein one or more printed system component parts are used in combination with the deployed standard components to create a complete system.

12. The method of claim 8, wherein the UXV library includes a variety of light weight unmanned ground vehicles (UGVS), fixed wings unmanned air vehicles (UAVS), quads rotors, hex-rotors, and unattended ground sensor (UGS).

13. The method of claim 12, wherein the library includes a variety of standard payloads interchangeable from platform to platform.

14. The method of claim 8, wherein the library provides an operator with a performance envelop of the printed system based on the selected combination of platform, parts, and payload(s).

15. The method of claim 8, wherein the 3D printer uses acrylonitrile butadiene styrene (ABS)-plus plastic material to create parts.

16. The method of claim 15, wherein the 3D printer uses ABS-plus plastic material in combination with one or more other materials to create composite parts.

17. The method of claim 16, wherein multiple material parts are printed.

18. The method of claim 8, wherein a common control architecture for controlling the devices is forced on every platform, part, component, and interchangeable payload in the libraries.

* * * * *